United States Patent [19]
Watson

[11] Patent Number: 4,838,197
[45] Date of Patent: Jun. 13, 1989

[54] GEARSHIFT INDICATOR CABLE MOUNTING CLIP

[75] Inventor: James A. Watson, Washington, Mich.

[73] Assignee: Chrysler Motors Corporation, Highland Park, Mich.

[21] Appl. No.: 239,920

[22] Filed: Sep. 2, 1988

[51] Int. Cl.$^4$ .......................... G01D 5/04; B60Q 11/00
[52] U.S. Cl. ........................... 116/28.1; 116/DIG. 20; 116/DIG. 21
[58] Field of Search ............ 116/28.1, 28 R, DIG. 20, 116/291, 327, 283, 281, 282, DIG. 21; 74/10.7, DIG. 7

[56] References Cited

U.S. PATENT DOCUMENTS

| | | | |
|---|---|---|---|
| 2,732,905 | 1/1956 | Anderson et al. | 116/DIG. 20 |
| 2,737,147 | 3/1956 | Bliss | 116/28.1 |
| 2,869,506 | 1/1959 | Grady | 116/DIG. 20 |
| 2,925,061 | 2/1960 | Thornburgh et al. | 116/28.1 |
| 3,050,028 | 8/1962 | Griffen et al. | 116/28.1 |
| 3,084,659 | 4/1963 | Griffen | 116/28.1 |
| 3,319,598 | 5/1967 | De Lorean | 116/28.1 |
| 3,830,192 | 8/1974 | Ronewicz et al. | 116/28.1 |
| 3,897,747 | 8/1975 | Biazzo | 116/28.1 |
| 4,261,282 | 4/1981 | Santou et al. | 116/DIG. 20 |
| 4,550,675 | 11/1985 | Lansinger et al. | 116/28.1 |
| 4,788,881 | 12/1988 | Owen et al. | 116/28.1 |

FOREIGN PATENT DOCUMENTS 620696  5/1961  Canada .............................. 116/28.1

*Primary Examiner*—William A. Cuchlinski, Jr.
*Assistant Examiner*—Jeffrey J. Hohenshell
*Attorney, Agent, or Firm*—Edward P. Barthel

[57] ABSTRACT

A vehicle steering column control cable mounting clip for an automatic transmission indicator dial system permitting the indicator pointer to be readily aligned with the dial indicia. The system includes a curvilinear looped flexible plastic tubular conduit having one end molded to the indicator housing and its other end molded to an adjustment slide selectively movable on a tongue portion of the clip by means of an adjustment screw interconnecting the slide and the clip. A flexible cable is slidable within the shielding conduit having one unshielded end connected to a pointer carrier and its other unshielded end fixed to a column rotatable shift tube actuator arm extending through an aperture in the column outer jacket. The clip has a pair of spring legs adapted for snap-in reception into the column jacket aperture and includes an integrally hinged lock-bar operative for positively capturing the clip in the aperture. Rotation of the column shift lever exerts a pull on the cable in one direction against a coil spring biasing the carrier in the opposite direction. By turning the adjustment screw the curvilinear shape of the conduit is altered relative to the inner cable modifying the spring tensioned condition of the cable thereby causing incremental aligning movement of the pointer relative to a selected dial indicia.

5 Claims, 3 Drawing Sheets

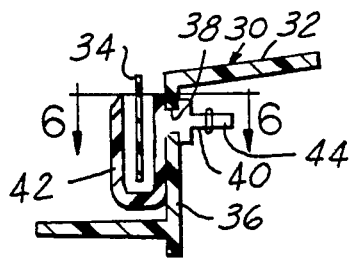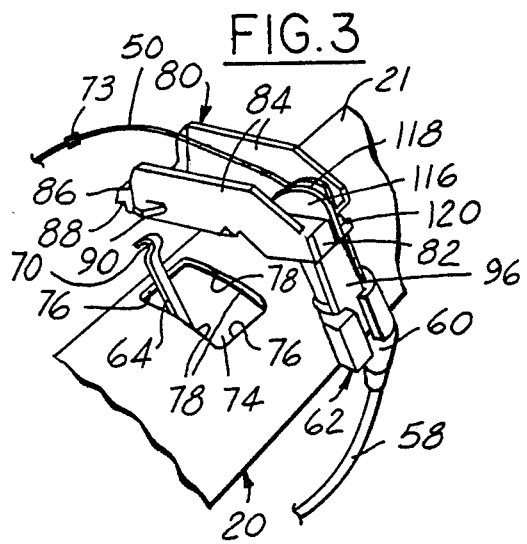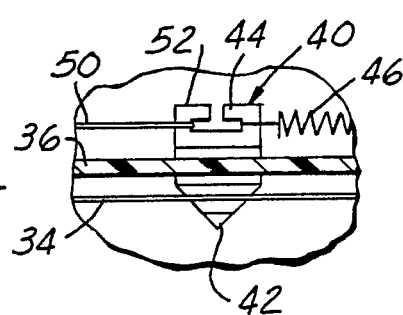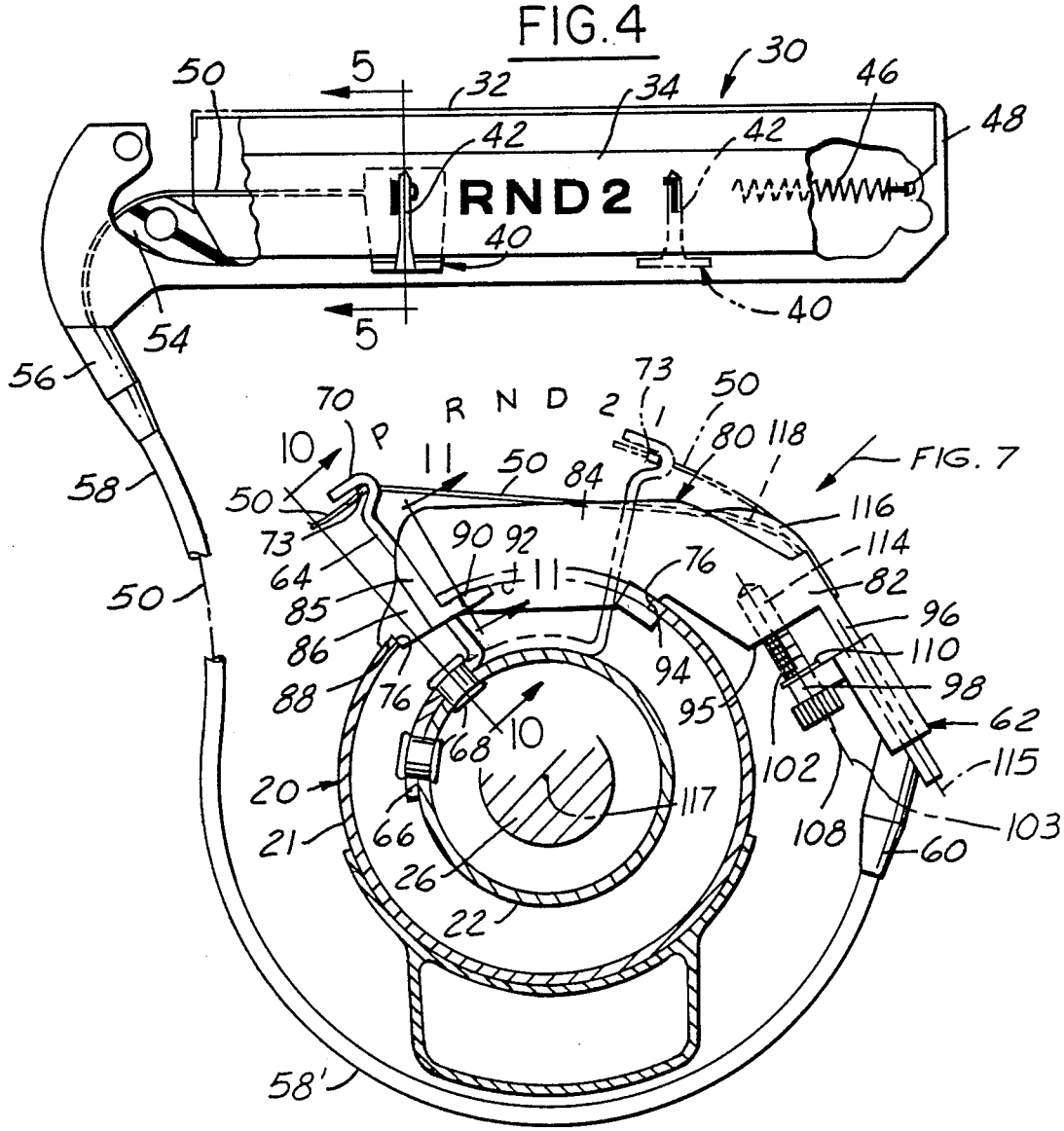

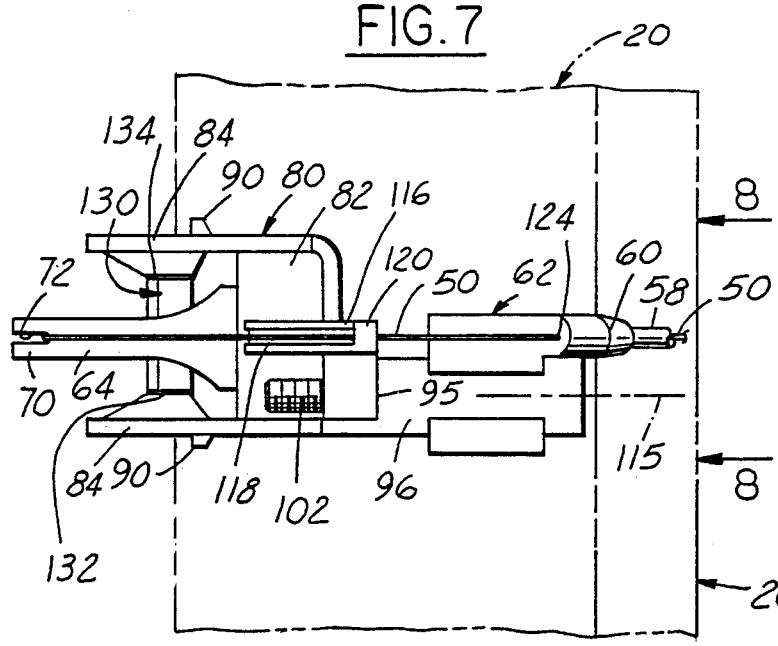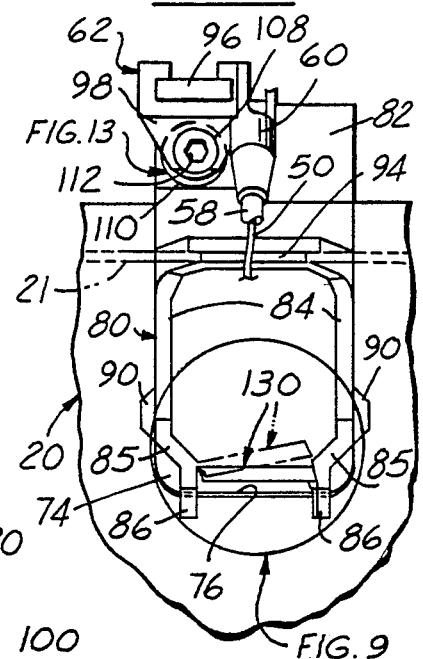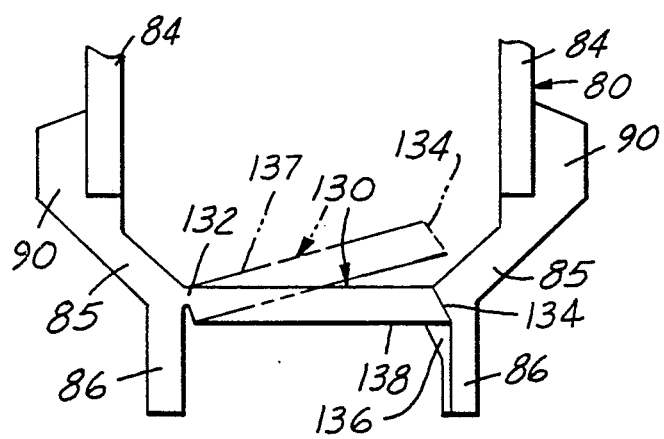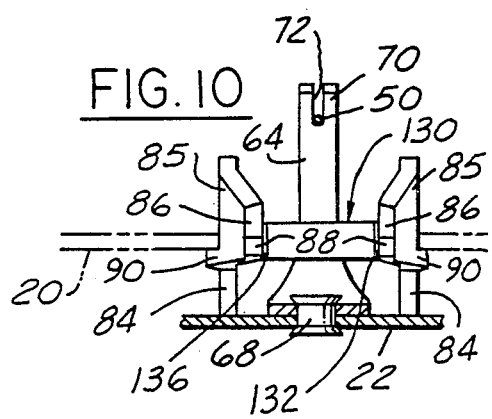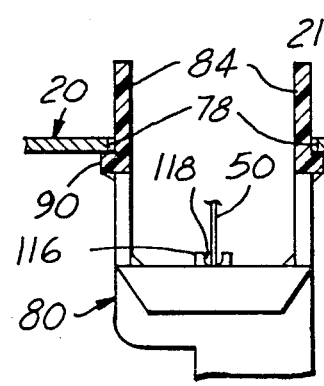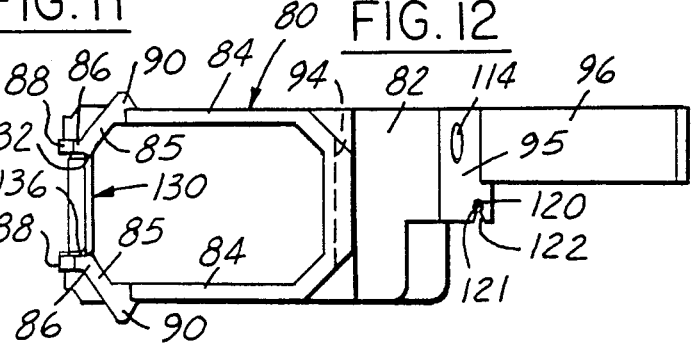

GEARSHIFT INDICATOR CABLE MOUNTING CLIP

BACKGROUND OF THE INVENTION

This invention relates to an indicator mechanism for a transmission control system and more particularly to an indicator connecting cable mounting clip apparatus for a steering column including adjustment means wherein the indicator pointer is readily aligned with a selected dial indicia. The prior art is replete with transmission ratio or position indicators to insure that a pointer or needle is aligned with the transmission ratio selections imprinted on an indicia dial surface. An example of one such arrangement is disclosed in U.S. Pat. No. 4,550,675 issued Nov. 5, 1985 to Lansinger et al. and assigned to the assignee of the present application. The Lansinger patent concerns a self-adjusting selector dial indicator mechanism wherein manual adjustment of the cable section connected to the shift lever is eliminated.

The U.S. Pat. No. 3,830,192 issued Aug. 30,1974 to Roniwicz et al. discloses an automatic transmission ratio indicator wherein the dial pointer is connected to an actuator cable by means of a slip clutch providing automatic calibration of the dial as the cable is adjusted to one extreme position.

The U.S. Pat. No. 2,925,061 issued Feb. 16, 1960 to Thornburgh et al. discloses an indicator mechanism for a vehicle transmission wherein an actuator cable is connected to a steering column shift control tube by means of a clip adjustably secured to the tube. The Thornborgh patent stresses the need for easy and quick connection of the indicator needle or pointer with the automatic transmission shift control tube as well as provision for adjustment in view of automotive assembly line mass production techniques.

It is therefore an object of the present invention to provide a cable mounting clip apparatus for a automotive transmission shift indicator incorporating a dial pointer adjustment which is quickly and easily assembled, incorporates a minimal number of components, and is positively retained in a locked manner on the vehicle steering column.

It is another object of the present invention to provide a cable mounting clip apparatus as set forth above which can be attached in an aperture in the steering column jacket in a simple snap-in manner and thereafter readily locked in the aperture by an integral hinged lock-bar while allowing nondestructive disassembly of the clip.

It is still another object of the present invention to provide a cable mounting clip apparatus as set forth above wherein a single threaded fastener may be rotated by a hand tool to achieve single-handed dual directional alignment of the indicator pointer with a selected dial indicia.

SUMMARY OF THE INVENTION

The present invention is for a vehicle automatic transmission control system wherein a shift tube is supported within an outer cylindrical jacket of a steering column apparatus. The shift tube is rotatable about its axis by a gear shift lever to a plurality of positions to effect different transmission settings. A conventional shift indicator housing is incorporated in the vehicle instrument panel, for example, such that its dial is readily visible by the driver. The dial displays a plurality of linearly spaced indicia corresponding to different transmission settings. A carrier, including an indicator pointer, is supported in an elongated, horizontal guide slot in the housing for reciprocal travel. One end of an expandable spring is connected to the housing while the spring other end is connected to the carrier such that the spring biases the carrier in one direction. The pointer is adapted to be moved by the carrier linear distances across the dial to provide visual indication of the transmission settings by successive alignment with the indicia such as park, reverse, neutral, drive, second, and low, for example.

A flexible plastic shielding conduit or casing has one end fixed by a connector to an indicator housing and the conduit other end fixed by a connector to a slide member adjustably supported on a cable mounting clip. The clip is adapted to be attached to a steering column aperture in a snap-in manner. The shielding conduit surrounds a flexible woven wire cable slidable therein such that when the gearshift lever is rotated the cable moves relative to the outer casing. One end of the cable protrudes from the casing housing connector and is affixed to the carrier with the cable being moved either with or against the bias of the spring. The cable opposite end protrudes from the conduit slide connector and is affixed to a radially extending control arm mounted on the column shift tube.

The present invention concerns the above mentioned cable snap-in mounting clip apparatus providing ready indicator dial pointer adjustment. The mounting clip apparatus includes a one-piece clip of plastic material adapted for ready locking engagement in a rectangular-shaped aperture provided in the steering column cylindrical jacket. The snap-in clip has a pair of cantilevered parallel spring legs extending from an integral base section formed with a channel-shaped groove adapted to engage one side of the aperture. An inwardly offset prong extension on each leg free end has a notch adapted to engage the aperture opposite side. Each leg includes a lug on its outer surface adapted to seat against an associated inner surface portion of the column jacket by virtue of the spring legs being squeezed together allowing passage of the lugs through the jacket aperture. Upon release of the clip legs by the installer the legs "snap back" or return to their normal positions parallel to the aperture sides thereby retaining or capturing the lugs in the aperture while the prong notches engage the opposite side of the aperture.

The cable mounting clip apparatus includes means to positively lock the clip in the steering column jacket aperture insuring against accidental removal of the clip. The locking means comprises a lock-bar integrally hinged to an inner portion of one spring leg prong. The hinge has a memory flexibly biasing the lock-bar in an inwardly angled position so as not to interfere with the clip spring legs being pressed together. Upon the spring legs being released the clip is retained in the column jacket aperture in a snap-in manner. The installer, by merely pushing with a finger on one surface of the lock-bar, swings the lock-bar to its engaged mode whereby its beveled free edge snapingly engages a complementary-shaped catch formed in the opposed prong. In its engaged mode the lock-bar is oriented at right angles to the prongs obviating inward movement of the spring legs. The lock-bar arrangement enables nondestructive disassembly of the clip by merely pushing on the opposed surface of the lock-bar wherein it is disengaged from its catch. Thereafter pressing the spring legs together frees their lugs for passage outwardly through the jacket aperture.

The clip base section is formed with an elongated tongue portion extending generally tangentially from the base section and adapted to adjustable support a slide member thereon. The slide member is adapted to be moved along the principal axis of the tongue portion, which tongue axis is orthogonal with the principal axis of the steering column shift tube. The slide member journally mounts an adjustment screw having a shank portion threadably received in the clip base section. The screw principal axis is aligned parallel to the tongue portion principal axis whereby rotation of the screw adjustably fixes the slide in a selected position on the tongue portion. The conduit other end is fixed to the slide connector such that sufficient conduit slack is provided to maintain the conduit in a curvilinear loop or bight path positioned around or adjacent the steering column, for example. Selective rotation of the adjustment screw causes the slide to move longitudinally relative to the tongue portion axis altering the curvilinear path of the conduit. It is known that altering such path increases or decreases the tensioned condition of the cable. In the disclosed embodiment to be described adjusting the slide closer to the clip reduces the cable's tensioned condition. This results in the spring bias selectively moving the pointer in an incremental manner one direction across the face of the dial for exact alignment with a predetermined indicia. Conversely adjusting the slide away from the clip increases the cable's tensioned condition and selectively moving the pointer in an incremental manner in the opposite direction across the dial.

Once installed the system provides an indicator pointer adjustment arrangement wherein the single adjustment screw is easily accessible to an assembly line installer by a screw rotating tool requiring only one hand of the worker to exactly align the indicator pointer during manufacture of the vehicle. Further, the present invention provides a cable mounting clip apparatus enabling customized adjustment for each vehicle on which it is installed.

BRIEF DESCRIPTION OF THE DRAWINGS

These and other objects and advantages of the invention will be more apparent from the following description and drawings wherein:

FIG. 3 is a view of a portion of FIG. 2 showing the clip in spaced relation to the steering column jacket;

FIG. 4 is an enlarged transverse sectional view of the steering column of FIG. 2 showing the clip mechanism in elevation and a diagrammatic view of the indicator housing with parts broken away demonstrating the operation of the present invention;

FIG. 5 is a fragmentary vertical sectional view taken on the line 5—5 of FIG. 4;

FIG. 6 is a fragmentary horizontal sectional view taken on the line 6—6 of FIG. 5;

FIG. 7 is an elevational view of the clip mechanism taken substantially in the direction of arrow "FIG. 7" in FIG. 4 with the steering column shown in dashed lines;

FIG. 8 is an enlarged elevational view taken substantially on the line 8—8 of FIG. 7;

FIG. 9 is an enlarged fragmentary view of the area within the circle designated FIG. 9 in FIG. 8;

FIG. 10 is a fragmentary elevational view, partly in section, taken on the line 10—10 of FIG. 4;

FIG. 11 is a fragmentary view taken on the line 11—11 of FIG. 4;

FIG. 12 is a detail elevational view of the clip looking radially outwardly in FIG. 4; and FIG. 13 is an enlarged fragmentary view of the area within the circle designated FIG. 13 in FIG. 8.

DETAILED DESCRIPTION OF THE INVENTION

Figure 1:
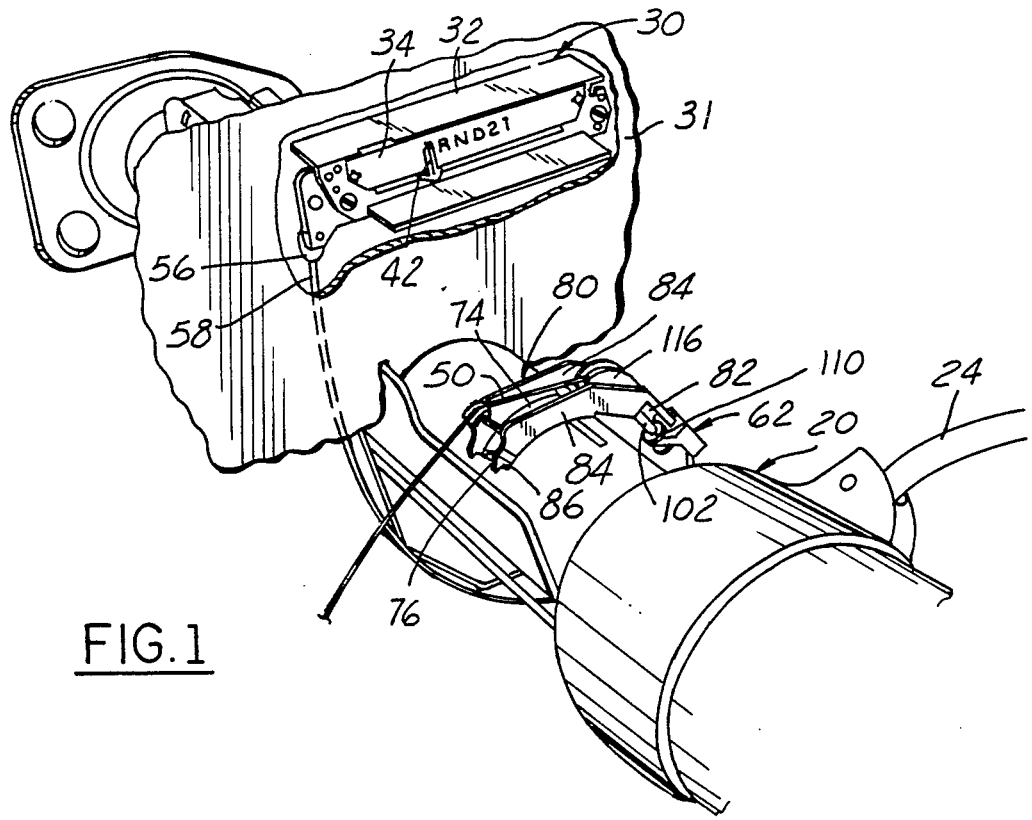
FIG. 1 is a fragmentary perspective view of a vehicle steering column showing a shift indicator arrangement for an automatic transmission.
Figure 2:
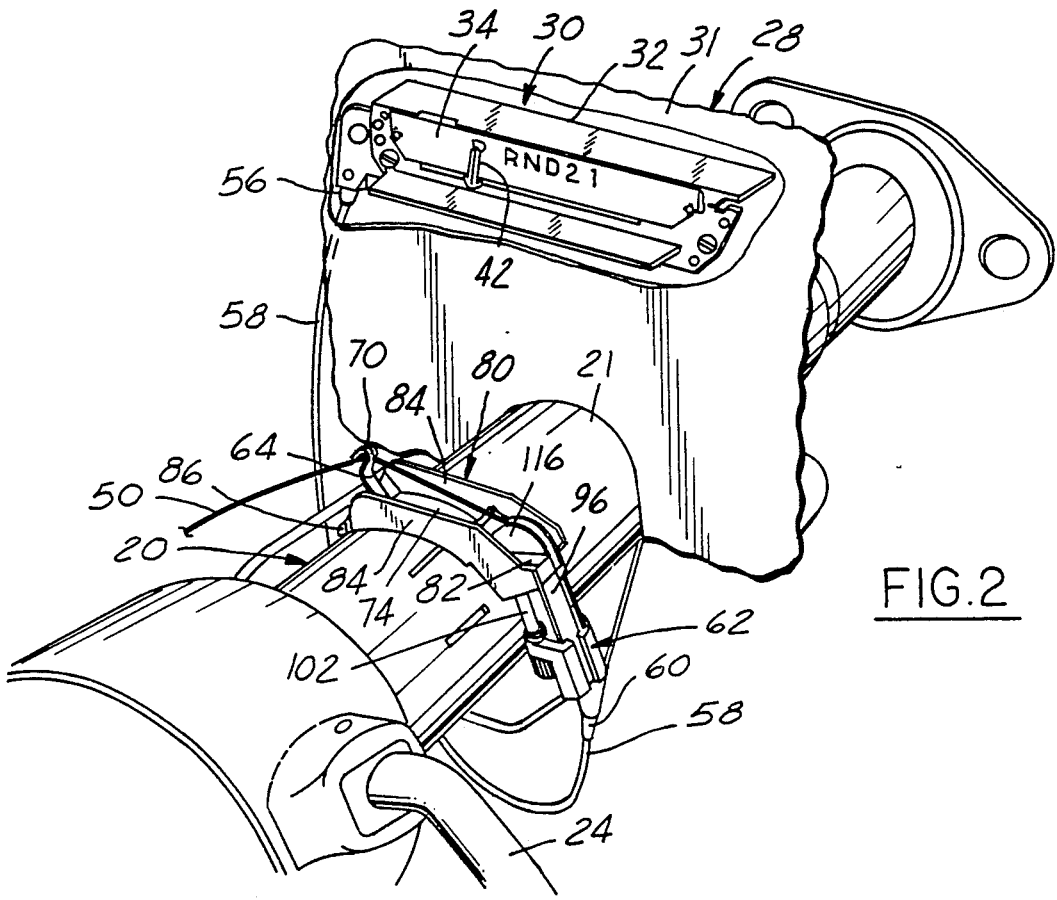
FIG. 2 is a view similar to FIG. 1 showing the arrangement from a different perspective.

Referring now to the drawings and more particularly to FIGS. 1 and 2 demonstrating a vehicle automatic transmission control indicator system is shown wherein the numeral 20 denotes an appropriately mounted vehicle steering column arrangement having an outer jacket 21. A tubular transmission control shift tube 22, shown in FIG. 4, is supported within the outer jacket 21 for rotation about the column principal axis. At the upper end of the transmission control shift tube 22, a conventional shift lever 24 is attached, and at the lower end, connection is made through suitable linage and a transmission (not shown). Reference may be made to U.S. Pat. No. 3,050,028 issued Aug. 21, 1962 to Griffen et al. for a showing of a typical transmission control arrangement the disclosure of which is incorporated by reference herein.

Rotation of the shift lever 24 by the operator will cause the transmission to be conditioned for different operating statuses in a well known manner. Also rotatably supported within the steering column jacket 21 is a steering shaft 26 as seen in FIG. 4. Since it is necessary for the operator to easily view the transmission settings, a conventional shift indicator generally indicated at 30, is diagrammatically shown in FIGS. 1 and 2 incorporated with instrument panel 31 supported above the steering column apparatus.

The transmission shift indicator 30 comprises a housing 32 having an indicator plate member or dial 34 secured thereto on which shift indicator designations are displayed on the dial face. The indicias are "P" for park, "R" for reverse, "N" for neutral, "D" for drive, "2" for second, and "1" for low drive mode.

Referring to FIG. 5 the indicator housing vertical wall 36 has an elongated, horizontal guide slot 38 therethrough. A carrier 40 is slidably supported in the guide slot 38 for horizontal, reciprocal travel therein. The carrier 40 includes a pointer 42 positioned for travel along the spaced indicia on the dial 34. As seen in FIG. 6 the carrier 40 is formed with a first finger 44 connected to one end of bias spring means in the form of a coiled tension spring 46. The other end of the spring 46 is connected to end wall 48 of the housing 32. A woven wire flexible cable 50 has one end fixed to carrier finger 52 and acts in opposition to the bias of the spring 46 and controls the positioning of the carrier pointer 42 adjacent different ones of the spaced dial indicia in response to the location of the cable other free end.

With reference to FIG. 4 it will be seen that the cable 50 exits the housing 32 by being threaded around an arcuate reel element 54 of the housing 32 and fed into cable connector 56 formed integral with the housing reel element 54. The connector has a cable passage therein connected to a flexible outer sheath or shielding conduit 58 formed of resilient material such as plastic. The cable 50 movably extends within the conduit 58 which conduit is shown in FIG. 4 looping downwardly in a curvilinear or arcuate path 58' circling beneath the steering column 20. The conduit 58 ends at a second connector 60 formed integral with an adjustable slide member 62 to be described.

As seen in FIGS. 3 and 4 the shift tube 22 has a radially extending actuator arm 64 fixedly attached by means of its integral curved foot portion 66 being mounted thereon by suitable means such as rivets 68. The outer free end of the arm 64 has a reverse bend hook portion 70 formed therein. FIG. 7 shows the hook portion 70 provided with a slit 72 lanced therein for reception of the cable 50. A retainer, such as a ferrule 73, is crimped on the free end of the cable 50 for ready capture by the hook portion 70 of the shift tube actuator arm 64.

In FIG. 3 the actuator arm 64 is seen positioned so as to extend through a rectangular shaped aperture 74 defining longitudinally extending side edges 76 and transversely extending fore and aft edges 78. A one-piece snap-in clip member, generally indicated at 80 in FIG. 4, is molded from suitable plastic material. The clip member comprises a base section 82 and a pair of integral, mirror image, resilient spring legs 84 extending in a parallel manner from each end of the base section 82. As seen in FIG. 8, an oblique element 85 extends forwardly at an obtuse angle from each spring leg 84 and terminates in an inwardly offset prong 86. Each prong 86 has a notch 88 provided therein adapted to engage one side 76 of the column aperture 74. Further, each spring leg 84 has a catch or lug 90 formed on its outer surface. The lugs 90 are adapted to engage the inner surface 92 of the column jacket 21 upon the spring legs 84 being squeezed together allowing passage of the lugs through the aperture 74. Upon release of the spring legs 84 by the installer the legs "snap back" or resiliently return to their normal positions parallel to the slot fore and aft edges 78 capturing the lugs 90 as the prong notches 88 engage their associated side edge 76.

With reference to FIGS. 4 and 12 the base section 82 is formed with a channel-shaped groove 94 extending transverse to the spring legs 84. The channel-shaped groove 94 is located adjacent the fixed ends of the spring legs 84 and is adapted to initially engage one side edge 76 of the aperture 74 during installation of the snap-in mounting clip 80.

FIGS. 4, 7, 8 and 12 show the clip base section 82 formed with an elongated adjustment tongue 96 slidably supporting the slide member 62 thereon. The adjustment tongue 96 is formed integral with the base section 82 and extends normal to a radial wall face 95 of the base section. In the disclosed embodiment the wall face 95 lies in a plane that substantially includes the principal axis 97 of the steering column 20.

As best seen in FIG. 13 the slide member 62 is formed with a depending ear 98 having a rounded slot 100 which necks-down for reception of an adjusting cap screw 102. The cap screw, with its principal axis shown at 103 in FIG. 4, has a intermediate journal portion 104 between its hollow or socket head 108 and a fixed collar 110 together with threaded shank 111. The cap screw journal portion 104 is inserted in the rounded slot 100 in a snap-in manner for rotation in the slot. In the preferred form the head 108 has a hex-shaped socket 112 for reception of a conforming driving tool, such as an Allen wrench, for rotating the cap screw.

The cap screw 102 is threadably inserted in an aligned threaded hole 114 in the base section 82. Thus, rotation of the cap screw 102 by a driving tool operates to move the slide 64 longitudinally toward or away from the clip base section wall 95 relative to the tongue 96 depending upon the direction of rotation of the cap screw. It will be noted in FIG. 4 that the slide travels along principal axis of the tongue portion, shown by dashed line 115 parallel to the screw axis 103. The axes 103 and 115 are each substantially orthogonal to principal axis 117 of the column shift tube. In this manner the slide 64 is adjustably maintained in a selected axial position along the axis 103 of the tongue portion 96.

The base section 82 has an integral arcuate cable guide reel portion 116 formed with a V-shaped cable groove 118 located intermediate the fixed ends of the spring legs 84. The cable groove 118 is aligned with a cable guide 120 (FIG. 12), formed integral with the reel 116, and includes a through aperture 121 provided with a cable entry slot 122. The guide aperture is adapted to receive the cable 50 therethrough as it exits the reel groove 118 for passage through a cable passage 124 (FIG. 7) in connector 60. One end of cable passage 124 communicates with the cable shielding conduit 58 allowing the cable 50 to be slidably received in the conduit 58.

As seen in FIGS. 4 and 7 the cable 50 exits the other end of passage 124 and is threaded around the reel 116. Thus, upon the installer pulling on the cable against the biasing spring 46 and feeding the cable through the actuator arm slit 72 the ferrule 73 is readily captured in the reverse bend portion 70.

With reference to FIGS. 8 and 9 the clip 80 includes locking means in form of a lock-bar 130 pivotally attached adjacent the proximate end of one spring arm prong 86 by means of an integral or "living" hinge 132. Prior to assembly the clip lock-bar 130 is positioned in its unlocked dashed line angled position wherein its beveled edge 134 is free of engagement with catch 136 formed on the opposite or right hand prong 86 inner surface. The mounting clip 80 is initially inserted in the column jacket aperture 74 with base section channel 94 engaging one side edge 76 and the prong notches 88 engaging the opposite aperture side edge 76. Release of the spring legs causes the lugs 90 to be captured by engaging the inner surface of the column jacket.

To complete the installation the installer uses a finger to push on one surface 137 of the lock-bar 130 pivoting it to its full line position in FIG. 9 wherein the beveled edge 134 locking engages the catch 136. In its locked mode the lock-bar 130 is oriented at right angles to the prongs 86 obviating inward movement the spring legs 84. The lock-bar 130 enables nondestructive disassembly of the snap-in clip 80 from the jacket aperture 76 by pushing against the lock-bar other surface 138 and returning it to the dashed line position of FIG. 9. With the lock-bar 130 unlocked it is only necessary to squeeze the spring legs 84 together allowing the lugs 90 to clear the aperture fore and aft edges 78 and lifting the clip from the column jacket 20.

In operation to adjust the pointer 42 into exact alignment with the indicator dial indicia the installer rotates the shift tube 22 by means of the shift lever 24 to its predetermined counter clockwise park "P" position shown by the full line actuator arm 64 position in FIG. 4. Next, the installer pulls on the free end of the cable 50 and secures the ferrule 73 in the actuator arm hook 70. The pointer 42 is then calibrated for alignment with the park indicia "P" as seen in full lines in FIG. 4 by rotating or dialing the cap screw socket head 108 in the appropriate clockwise or counter clockwise direction.

Thus, to adjust the pointer 42 to the right, as viewed in FIG. 4, the cap screw socket head 108 is rotated clockwise by the installer to selectively move the slide member 62 toward the clip base section wall 95. As a result the looped or bight configured conduit 58 is flexed into a slightly different curvilinear path causing a change in the configuration of the conduit 58 relative to the tensioned cable 50. It can be demonstrated that in the disclosed embodiment such change in conduit curvilinear configuration caused by adjustment of the slide 62 towards the clip base portion 82 tends to relieve tension in the cable 50 thereby allowing the spring 46 to move the carrier 40 rightward an incremental distance to exactly align the pointer 42 with the park indicia "P".

Conversely, to adjust the pointer 42 to the left, as viewed in FIG. 4, the cap screw socket head 108 is rotated counter clockwise by the installer to selectively move the slide member 62 away from the clip base section 82. This causes the conduit 58 loop or bight portion to flex into a different curvilinear path. Again, it can be demonstrated that such relative change in configuration between the conduit and the cable tends to slightly increase the tensioned condition of the cable 50. This extends the coil spring 46 whereby the tensioned cable moves the carrier 40 an incremental distance leftward and exactly aligns the pointer 42 with the park indicia "P". Although but one embodiment of the invention is herein shown and described, it will be understood that various changes in the size, shape and arrangement of parts may be made without departing from the spirit of the invention and it is not the intention to limit said invention other than by the terms of the appended claims.

What is claimed is:

1. In a gearshift indicator mechanism for a vehicle automatic transmission control system having a transmission shift tube which is supported within a cylindrical outer jacket of a vehicle steering column apparatus and which shift tube is rotatable to a plurality of positions by a gearshift lever to effect different transmission settings, an actuating arm fixed on said shift tube and extending outwardly through an aperture in said column jacket, said aperture being rectangular shaped defining parallel side edges and parallel fore and aft edges, means supporting an indicator housing having a dial on its front side displaying a plurality of spaced indicia corresponding to different transmission settings, a tension coil spring fixed to said housing, a carrier is movably supported in housing guide means and connected to said spring such that said spring biases said carrier in a first direction, a pointer extending from said carrier and adapted to move across said dial to provide visual indication of the transmission settings by successive alignment with each said indicia, a flexible cable having an intermediate portion slidable within a plastic shielding conduit, one end of said cable connected to said carrier tensioned to ac in opposition to said spring bias and the other end of said cable connected to said shift tube actuating arm, a steering column cable mounting clip apparatus for said indicator mechanism comprising:

a one-piece clip molded of plastic material having snap-in means adapted for releasably securing said clip in said column jacket aperture;

said clip formed with an elongated adjustment tongue portion extending outwardly from said clip such that its principal axis extends in a direction substantially orthogonal to the principal axis of said column, a slide member slidably disposed on said tongue for reciprocal travel thereon along said tongue principal axis;

an adjustment screw having a journal portion intermediate a drive head and a threaded shank, said screw journal portion rotatably supported on said slide member with its shank threadably received in an aligned bore in said clip such that the principal axis of said screw is oriented parallel to said tongue principal axis;

said plastic shielding conduit defining a curvilinear looped path having a first end connected to said slide member and its second end connected to said indicator housing;

one section of said cable exiting said conduit first end with its free end fixed to said carrier, the other end of said cable fixed to said tube actuating arm;

cable reel means integral with said clip guiding said cable for travel on said clip, said cable operative to move said carrier in one direction against the bias of said spring means upon movement of said shift lever in one direction, and whereby the bias of said spring means operative to move said carrier in the opposite direction upon movement of said shift lever in the opposite direction;

whereby upon linear adjustment of said slide member away from said clip by rotation of said screw in one direction increasing the tension exerted by said cable on said spring such that said carrier is moved an incremental distance in said one direction, and whereby adjustment of said slide toward said clip by rotation of said screw in the opposite direction decreasing the tension exerted by said cable on said spring such that said carrier is moved an incremental distance in said other direction wherein said pointer on said carrier is adapted to be selectively adjusted into correct alignment with each of said dial indicia.

2. The mounting clip apparatus as set forth in claim 1, wherein:

said one piece clip having a pair of resilient mirror image cantilever spring legs extending in a first direction from an integral base section, said base section formed with channel-shaped groove means adapted to engage one side edge of said aperture, an inwardly offset prong portion extending from the free end of each said spring leg and formed with a notch adapted to engage the opposite side of said aperture;

each said spring leg formed with lug means extending outwardly therefrom adapted to engage the internal surface of said column jacket upon said spring legs being flexed inwardly, whereby each said lug means clears said aperture fore and aft edges such that upon release of said spring legs each said lug means retaining said clip in said steering column jacket aperture.

3. The mounting clip apparats as set forth in claim 2, wherein:

a lock-bar integrally hinged to an inner portion of one said prong, said lock-bar hinge having a memory flexibly orienting said lock-bar in an angled position permitting said spring legs to be readily pressed together; and upon said spring legs being released the installer presses on said lock-bar causing said lock-bar to move about said hinge whereby its free edge engages a catch formed on the opposite prong such that said lock-bar is releasably orientated at right angles to said prongs obviating inward movement of said spring legs and positively capturing said clip in said column jacket aperture.

4. In a gearshift indicator mechanism for a vehicle automatic transmission control system having a transmission shift tube which is supported within a cylindrical outer jacket of a vehicle steering column apparatus and which shift tube is rotatable to a plurality of positions by a gearshift lever to effect different transmission settings, an actuating arm fixed on said shift tube and extending outwardly through an aperture in the said column jacket, said aperture being rectangular shaped defining parallel side edges and parallel fore and aft edges, a steering column cable mounting clip apparatus for said indicator mechanism comprising:

a one-piece clip molded of plastic material having snap-in means adapted for releasably securing said clip in said column jacket aperture;

said one piece clip having a pair of resilient mirror image cantilever spring legs extending in a first direction from an integral base section, said base section formed with channel-shaped groove means adapted to engage one side edge of said aperture, an inwardly offset prong portion extending from the free end of each said spring leg and formed with a notch adapted to engage the opposite side of said aperture;

each said spring leg formed with lug means extending outwardly therefrom adapted to engage the internal surface of said column jacket upon said spring legs being flexed inwardly, whereby each said lug means clears said aperture fore and aft edges such that upon release of said spring legs each said lug means retaining said clip in said steering column jacket aperture.

5. The mounting clip apparatus as set forth in claim 4, wherein:

a lock-bar integrally hinged to an inner portion of one said prong, said lock-bar hinge having a memory flexibly orienting said lock-bar in an angled position permitting said spring legs to be readily pressed together; and upon said spring legs being released the installer presses on said lock-bar causing said lock-bar to move about said hinge whereby its free edge engages a catch formed on the opposite prong such that said lock-bar is releasably orientated at right angles to said prongs obviating inward movement of said spring legs and positively capturing said clip in said column jacket aperture.

* * * * *